United States Patent
Wada et al.

(10) Patent No.: US 9,644,992 B2
(45) Date of Patent: May 9, 2017

(54) GAS METER READING SYSTEM AND METER READING METHOD

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 15/089,009

(22) Filed: Apr. 1, 2016

(65) Prior Publication Data

US 2016/0290829 A1    Oct. 6, 2016

Related U.S. Application Data

(63) Continuation-in-part of application No. 14/406,308, filed as application No. PCT/JP2013/003620 on Jun. 7, 2013, now abandoned.

(30) Foreign Application Priority Data

Jun. 8, 2012   (JP) .................................. 2012-130617

(51) Int. Cl.
   *G01D 4/00* (2006.01)
   *G01F 25/00* (2006.01)
   (Continued)

(52) U.S. Cl.
   CPC ........... *G01D 4/002* (2013.01); *G01F 15/063* (2013.01); *G01F 25/0053* (2013.01);
   (Continued)

(58) Field of Classification Search
   CPC ........ G01D 4/002; G01D 4/004; G01D 4/006; G01D 4/008; G06Q 50/00; G06Q 50/06;
   (Continued)

(56) References Cited

U.S. PATENT DOCUMENTS 5,953,682 A    9/1999   McCarrick et al.
8,248,269 B1 *  8/2012   Boyd ...................... H04Q 9/00
                                     340/870.02
(Continued)

FOREIGN PATENT DOCUMENTS

| JP | H02222100 A | 9/1990 |
| JP | H08329159 A | 12/1996 |
| JP | 2008032483 A | 2/2008 |
| WO | W02004004364 A2 | 1/2004 |
| WO | W02004106868 A1 | 12/2004 |

OTHER PUBLICATIONS

Office Action dated Jan. 29, 2015 in corresponding Australian Patent Application No. 2013272941, 5 pages.
(Continued)

*Primary Examiner* — Hai Phan
*Assistant Examiner* — Franklin Balseca
(74) *Attorney, Agent, or Firm* — Lee & Hayees, PLLC

(57) ABSTRACT

A delivery server includes: a reception unit of receiving meter indication data of an existing gas meter and meter indication data of a new gas meter from a mobile terminal; a modification unit causing the new gas meter to be managed as a gas meter to be managed that is installed in a supply facility; and a meter reading processing unit performing a gas meter reading processing for the supply facility, when meter indication data of the new gas meter on a current meter indication date from the mobile terminal after gas meter replacement, on the basis of the received meter indication data, respective meter indication data of the new gas meter and the existing gas meter in the gas meter replacement, and meter indication data of the existing gas meter in the supply facility on a previous meter indication date of earlier than the gas meter replacement.

3 Claims, 12 Drawing Sheets

(51) Int. Cl.
*H04Q 9/00* (2006.01)
*G06Q 50/06* (2012.01)
*G01F 15/06* (2006.01)

(52) U.S. Cl.
CPC ........... *G06Q 50/06* (2013.01); *H04Q 9/00* (2013.01); *G01F 15/06* (2013.01); *G01F 25/0007* (2013.01); *H04Q 2209/60* (2013.01)

(58) Field of Classification Search
CPC ....... H04B 2203/5433; H04Q 2209/00; H04Q 2209/10; H04Q 2209/20; H04Q 2209/50; H04Q 2209/60; H04Q 2209/70; Y02B 90/24; Y02B 90/241; Y02B 90/242; Y02B 90/423; Y02B 90/245; Y04S 20/30; Y04S 20/32; Y04S 20/322; Y04S 20/325; Y04S 20/36; Y04S 20/46; G01F 15/06; G01F 15/063; G01F 25/0007; G01F 25/0053
See application file for complete search history.

(56) References Cited

U.S. PATENT DOCUMENTS

2013/0304264 A1* 11/2013 Shao ..................... G01F 15/063
700/282
2015/0123814 A1 5/2015 Wada et al.

OTHER PUBLICATIONS

International Preliminary Examination Report on Patentability mailed Dec. 18, 2014 for PCT application No. PCT/JP2013/003620, 6 pages.
Office action for U.S. Appl. No. 14/406,308, mailed on Nov. 2, 2015, Wada, "Gas Meter Reading System and Meter Reading Method," 9 pages.
Office Action for U.S. Appl. No. 14/406,308, mailed on Jul. 2, 2015, Wada, "Gas Meter Reading System and Meter Reading Method," 9 page.
PCT Search Report mailed Aug. 20, 2013 for PCT application No. PCT/JP2013/003620, 1 page.

* cited by examiner

| CUSTOMER ID | METER NUMBER | ... | GAS CYLINDER CAPACITY | NUMBER OF CYLINDERS | ENTIRE/HALF CLASSIFICATION | AREA CODE |
|---|---|---|---|---|---|---|
| A0001 | 56AB001 | ... | 50kg | 1 | 1 | 18 |
| A0001 | 56AB002 | ... | 50kg | 2 | 2 | 18 |
| A0003 | 56AB003 | ... | 30kg | 1 | 1 | 19 |
| ... | ... | ... | ... | ... | ... | ... |

FIG.3

| CUSTOMER ID | METER NUMBER | REMAINING GAS AMOUNT | REPLACEMENT FLAG |
|---|---|---|---|
| A0001 | 56AB001 | 35.6m$^3$ | 1 |
| A0001 | 56AB002 | 26.6m$^3$ | |
| A0003 | 56AB003 | 10.6m$^3$ | 1 |
| ⋮ | ⋮ | ⋮ | ⋮ |

┌─────────────────────────────────────────┐
          │          METER REPLACEMENT              │
          │             REGISTRATION                │
          │                                         │
d65 ───▸  │  REGISTRATION DATE:     APRIL 10th, 2012│
d61 ───▸  │  UNINSTALLED METER NUMBER: 56AB001      │
d62 ───▸  │  UNINSTALLED METER INDICATION: [      ] │
d63 ───▸  │  UNINSTALLED METER NUMBER: [      ] [QR]│
d64 ───▸  │  UNINSTALLED METER INDICATION: [      ] │
          │  LOCATION:           [OUTDOOR       ▼]  │
          │  FLOOR NUMBER:       [000]              │
          │  MICROCOMPUTER SETTING: [NORMAL SETTING▼]│
          │  METER USAGE PURPOSE:  [            ▼]  │
          │  TRASFER REASON:       [            ▼]  │
          │  REPLACEMENT REASON:   [            ▼]  │
          │  RECYCLE CLASSIFICATION: [YES       ▼]  │
          │                                         │
          │  [ RETURN ]              [ REGISTER ]   │
          └─────────────────────────────────────────┘

FIG.6
```

| | | |
|---|---|---|
| d71 → | TICKET ID | --- |
| d72 → | AREA CODE | /8 |
| d73 → | METER READER ID | A0001 |
| d74 → | METER READING DATE | 2012/3/30 |
| d75 → | CUSTOMER ID | 101234 |
| d76 → | METER NUMBER | 56AB321 |
| d77 → | METER INDICATION | 235.2 |
| | ⋮ | ⋮ | d70

FIG.7

| CUSTOMER ID | AREA CODE | CUSTOMER ID | METER NUMBER | METER READING DATE | METER INDICATION | ... |
|---|---|---|---|---|---|---|
| --- | 18 | A0001 | 56AB321 | 2012/3/30 | 235.2 | --- |
| --- | 18 | A0002 | 56AB222 | 2012/3/30 | 200.5 | --- |
| --- | 18 | A0003 | 56AB001 | 2012/3/30 | 210.3 | --- |
| ... | ... | ... | ... | ... | ... | ... |

FIG.8

| METER NUMBER | PRODUCT MODEL | GAS TYPE | ... | FLOW RATE RANGE | MAXIMUM FLOW RATE |
|---|---|---|---|---|---|
| 56AB001 | 4 | LPG | ... | 5 | 0m³/h |
| ... | ... | ... | ... | ... | ... |

FIG.9

GAS METER READING SYSTEM AND METER READING METHOD

CROSS-REFERENCE TO RELATED APPLICATIONS

This application is a continuation-in-part application of U.S. patent application Ser. No. 14/406,308 under 37 Code of Federal Regulations §1.53 (b) and the said US application which is a US national phase of PCT Application No. PCT/JP2013/003620 filed on Jun. 7, 2013 claims the benefit of Japanese Patent application No. 2012-130617 filed on Jun. 8, 2012, which are hereby incorporated by reference in their entirety.

TECHNICAL FIELD

The present invention relates to a system for and a method of performing a meter reading processing with use of a meter indication of a gas meter.

BACKGROUND ART

It is known that supply of LP gas is based on imports from gas producing countries and domestic production as a by-product in the course of producing petroleum products. Petroleum refining terminals and import terminals for storing LP gas carried from gas producing countries by tankers are respectively referred to as primary terminals. LP gas is loaded into domestic vessels and/or tank trucks in the primary terminals and is shipped to secondary terminals located on the coast or inland as hub terminals for LP gas transportation. Further, LP gas carried to the secondary terminals is transported to LP gas filling stations in various locations, i.e., delivery branches, and is then injected into gas cylinders (gas canisters) in the delivery branches.

The gas cylinders, filled with LP gas in the respective filling stations, are delivered to customers' places such as residential houses, apartment houses and work places by deliverymen. Empty gas cylinders in the customers' places are replaced with full gas cylinders, and are brought back to the respective filling stations. In each filling station, a fixed delivery area is assigned to each deliveryman as an area of which he/she is in charge. Each deliveryman is given delivery tickets to be delivered to customers' places within his/her responsible delivery area in 2 to 10 days.

The delivery tickets are created by a delivery manager. First, the amount of LP gas remaining in each gas cylinder is predicted based on a past gas usage record of each customer, a meter indication of a gas meter in each customer's place, a delivery record and so forth, and the next delivery due date of each gas cylinder is determined. The number of gas cylinders to be delivered in 2 to 10 days is determined by accumulating the number of gas cylinders of all the customers within the delivery area of which each deliveryman is in charge.

In replacing a gas cylinder based on a delivery ticket, a deliveryman fills in the respective items of the delivery ticket including a replacement date, a meter indication on the date, a cylinder number and a safety inspection. When a daily delivery work is finished, delivery tickets are handed in to the delivery manager. The delivery manager checks if each delivery ticket returned to him/her includes incomplete items, and then, stores each checked delivery ticket as data for calculating the next delivery due date. Under the aforementioned method, a system for enhancing efficiency in delivery of a gas cylinder has been proposed (see PTL 1).

As disclosed in PTL 1, a conventional system exists for enhancing efficiency in delivery of a gas cylinder, but no system exists which is configured to receive meter indicative gas usage of gas meters installed before and after gas meter replacement in performing the gas meter replacement, and thereby, to quickly perform a meter reading processing in accordance with the meter indications after the gas meter replacement.

CITATION LIST

Patent Literature

PTL 1: Japan Patent Laid-Open No. H08-329159(1996)

Technical Problem

In view of the aforementioned situation, it is an object of the present invention to provide a gas meter reading system and a meter reading method whereby, even when a gas meter is replaced, a meter reading process can be quickly performed in accordance with meter indications of gas meters.

Solution to Problem

To solve the aforementioned problem, the present invention relates to a gas meter reading system for performing a gas meter reading process for detecting gas usage in each of a plurality of supply facilities, and the gas meter reading system includes: a management unit that is configured to manage a single or plurality of sets of meter indication data of each of a plurality of gas meters installed in the plurality of supply facilities; a reception unit that is configured to receive a set of meter indication data of an existing gas meter and a set of meter indication data of a new gas meter from a communication terminal when gas meter replacement is performed; a modification unit that is configured to cause the management unit to manage the new gas meter as a gas meter to be managed that is installed in a corresponding one of the plurality of supply facilities; and a meter reading processing unit that is configured to perform the gas meter reading processing for the corresponding one of the plurality of supply facilities when the reception unit receives a set of meter indication data of the new gas meter in the corresponding one of the plurality of supply facilities on a current meter indication date from the communication terminal after the gas meter replacement, with the gas meter reading processing being configured to be performed based on the received set of meter indication data, respective sets of meter indication data of the new gas meter and the existing gas meter in the gas meter replacement, and a set of meter indication data of the existing gas meter in the corresponding one of the plurality of supply facilities on a previous meter indication date of earlier than the gas meter replacement.

Furthermore, to solve the aforementioned problem, the present invention relates to a meter reading method in which a computer performs a gas meter reading process in accordance with gas meter replacement, wherein the computer includes a management unit configured to manage a single or plurality of sets of meter indication data of each of a plurality of gas meters installed in a plurality of supply facilities, and the meter reading method includes the steps of: receiving a set of meter indication data of an existing gas meter and a set of meter indication data of a new gas meter from a communication terminal when the gas meter replacement is performed; causing the management unit to manage the new gas meter as a gas meter to be managed that is installed in a corresponding one of the plurality of supply facilities; and performing the gas meter reading processing for the corresponding one of the plurality of supply facilities when a set of meter indication data of the new gas meter in the corresponding one of the plurality of supply facilities on a current meter indication date is received from the communication terminal after the gas meter replacement, with the gas meter reading processing being configured to be performed based on the received set of meter indication data, respective sets of meter indication data of the new gas meter and the existing gas meter in the gas meter replacement, and a set of meter indication data of the existing gas meter in the corresponding one of the plurality of supply facilities on a previous meter indication date of earlier than the gas meter replacement.

According to the present invention, it is possible to quickly perform a meter reading processing in accordance with meter indications of gas meters even when a gas meter is replaced.

BRIEF DESCRIPTION OF DRAWINGS

FIG. 3 is a diagram showing an exemplary structure of customer information stored in a storage device of the delivery server in FIG. 1;

FIG. 4 is a diagram showing an exemplary structure of information that includes a remaining gas amount and is stored in the storage device of the delivery server in FIG. 1;

FIG. 6 is a diagram showing an exemplary operating screen when a mobile terminal in FIG. 1 transmits respective sets of meter indication data in gas meter replacement;

FIG. 7 is a diagram showing exemplary meter indication data; and

FIG. 8 is a diagram showing an exemplary structure of multiple sets of meter indication data stored in the storage device of the delivery server in FIG. 1.

FIG. 9 is a diagram showing an exemplary gas meter table.

DESCRIPTION OF EMBODIMENTS

Explanation will be hereinafter provided for a schematic configuration of a system in the present exemplary embodiment. The present system is configured to perform a gas meter reading process for a supply facility in performing gas meter replacement by use of sets of meter indication data including meter indications of gas meters installed before and after the replacement.

Figure 1:
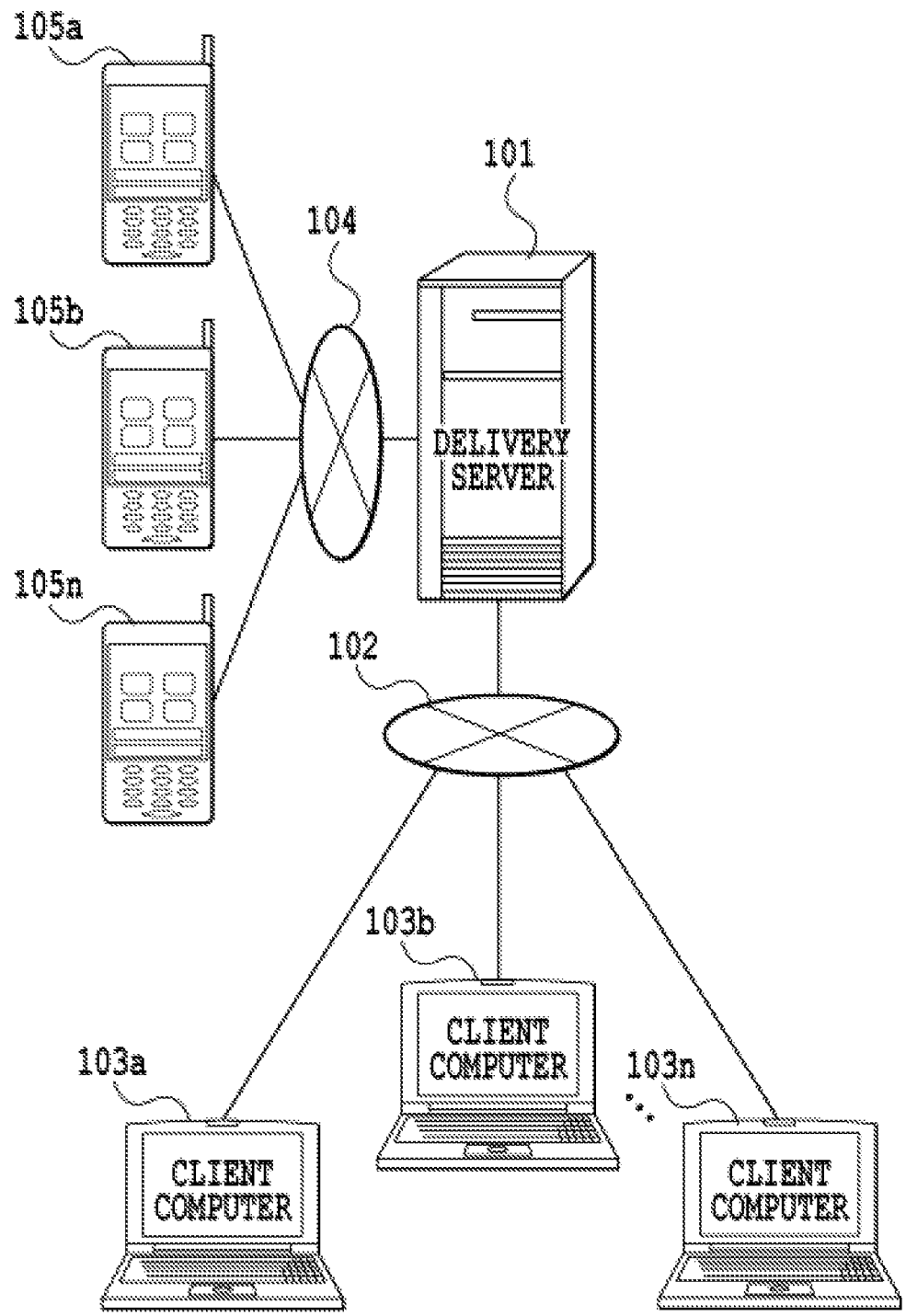
FIG. 1 is a diagram showing an exemplary network configuration according to an exemplary embodiment of the present invention.

FIG. 1 is a diagram showing a network configuration according to the exemplary embodiment of the present invention. In FIG. 1, a delivery server (gas meter reading system) 101 is configured to communicate with multiple client computers 103a, 103b . . . 103n through a network 102. Further, the delivery server 101 is configured to communicate with multiple mobile terminals (communication terminals) 105a, 105b . . . 105n through a network 104. It should be noted that the multiple client computers 103a-103n are collectively referred to as client computers 103, and the multiple mobile terminals 105a-105n are collectively referred to as mobile terminals 105.

The client computers 103 are terminals that are located in a delivery center for managing deliveries from the respective delivery branches in a unified manner, for instance, and are used by users in the delivery center. A user establishes a connection to the delivery server 101 through a client computer 103 and exclusively performs various delivery tasks such as confirmation of a delivery status and an instruction to creating delivery data. It should be noted that the client computers 103 may be located in, for instance, delivery branches or other locations.

The mobile terminals 105 are terminals to be used by workers (including e.g., meter readers, deliverymen, safety inspectors, etc.) who check meter indications of gas meters respectively installed in the supply facilities equipped with gas cylinders. The mobile terminals 105 respectively include a CPU, a memory, an input device, a display device and so forth. The aforementioned workers collect sets of meter indication data, respectively including a meter indication of each gas meter, using the mobile terminals 105 and transmit the collected sets of meter indication data to the delivery server 101. It should be noted that each set of meter indication data is transmitted to the delivery server 101, for instance, the reading a gas meter, the opening/closing of a valve, the conducting of a safety inspection, the delivery of one or more gas cylinders, the replacement of a gas meter for another, and so forth.

[Configuration of Delivery Server]

Figure 2:
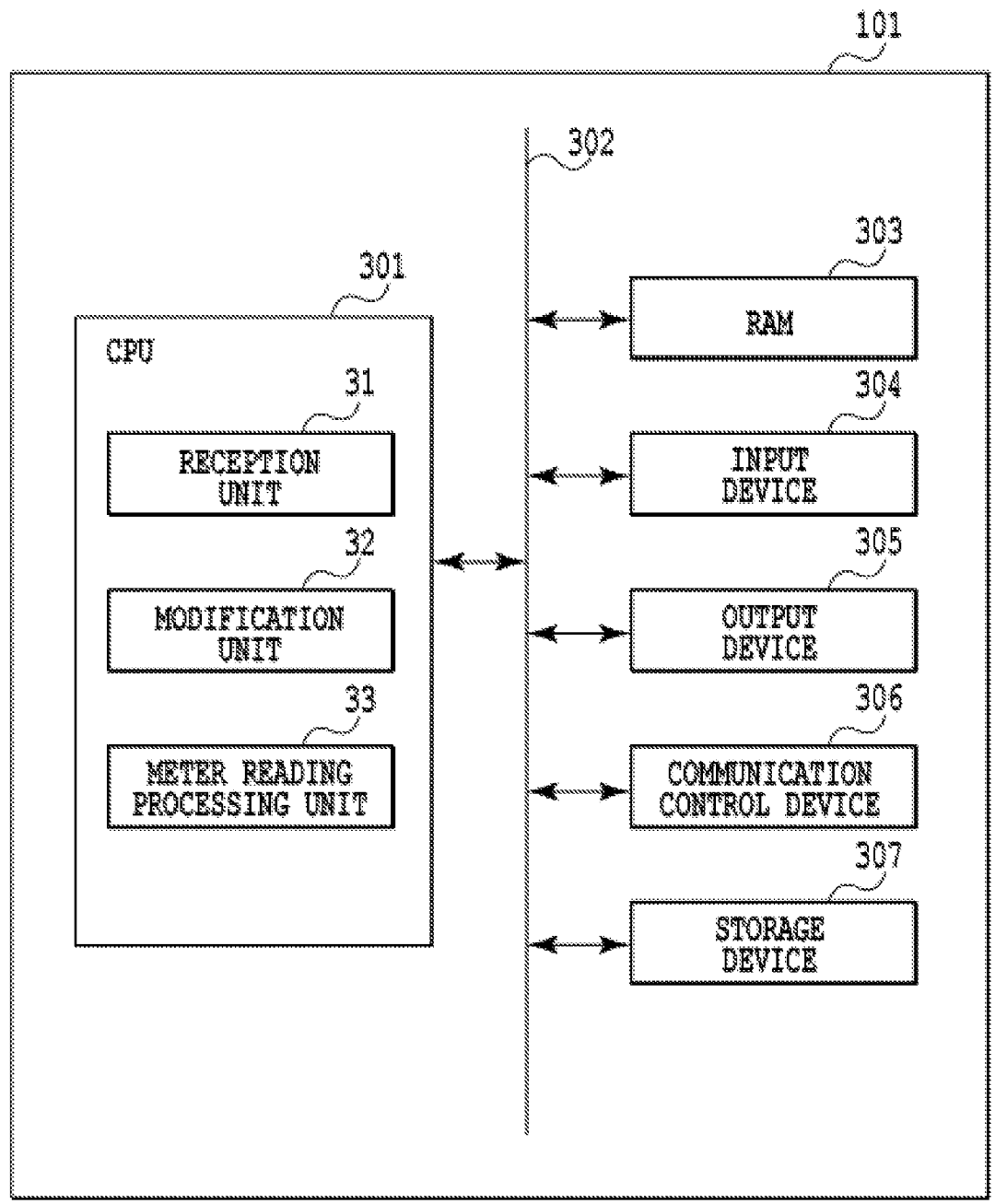
FIG. 2 is a block diagram showing an exemplary configuration of a delivery server in FIG. 1.

FIG. 2 is a block diagram showing an exemplary configuration of the delivery server 101. It should be noted that FIG. 2 explains a configuration employing a single computer system, but the delivery server 101 can be configured as a part of a multifunctional distribution system comprising multiple computer systems.

As shown in FIG. 2, the delivery server 101 includes a CPU 301, a system bus 302, a RAM 303, an input device 304, an output device 305, a communication control device 306 and a storage device (management unit) 307.

The CPU 301 is coupled to the respective component elements through the system bus 302, and is configured to perform processing for transferring control signals and data. Also, the CPU 301 is configured to run various software programs and perform arithmetic and logic processing and so forth in order to implement operation of the entire delivery server 101.

The RAM 303 has a work area for storing temporarily data and the software programs.

The storage device 307 includes a non-volatile storage medium such as a ROM or a HDD, and has a program storage area for storing the software programs and a data storage area for storing data to be obtained on an as-needed basis, data as processing results, and so forth. For example, a software program is retrieved from the program storage area of the storage device 307 into the work area of the RAM 303, and is run by the CPU 301. Thus, the CPU 301 of the present exemplary embodiment implements functions of respective units 31 to 33 to be described.

As shown in FIG. 2, the CPU 301 includes a reception unit 31, a modification unit 32 and a meter reading processing unit 33.

The reception unit 31 is configured to receive meter indication data of a gas meter for detecting the gas usage in a gas cylinder installed in a supply facility. The indication data is transmitted from a given mobile terminal 105. The meter indication data includes a meter indication of gas usage in the gas cylinder, a meter indication date, and so forth. Detailed explanation thereof will be described below.

Further, in the present exemplary embodiment, the reception unit 31 is configured to receive meter indication data of an existing gas meter and meter indication data of a new gas meter from the mobile terminal 105 when gas meter replacement is performed.

The modification unit 32 is configured enables the storage device 307 to manage a new gas meter based on the meter indication data received by the reception unit 31 as a gas meter to be managed that is installed the supply facility.

When receiving meter indication data of the new gas meter for the supply facility on the current meter indication date from the mobile terminal 105 after gas meter replacement, the meter reading processing unit 33 is configured to perform a gas meter reading process for the supply facility on the basis of the received meter indication data, respective sets of meter indication data of the existing gas meter and the new gas meter in gas meter replacement, and meter indication data of the existing gas meter for this same supply facility on the previous meter indication date of earlier than gas meter replacement. For example, a processing of calculating a gas usage and a processing of calculating a remaining gas amount may be employed as the gas meter reading processing.

[Process of Calculating Gas Usage]

In the processing for calculating gas usage, the gas consumed in a period from the previous meter indication date to the current meter indication date is calculated based on {(a meter indication included in meter indication data on the current meter reading date)−(a meter indication included in meter indication data of a new gas meter in gas meter replacement)}+{(a meter indication included in meter indication data of an existing gas meter in gas meter replacement)−(a meter indication included in meter indication data of the existing gas meter on the previous meter reading date of earlier than gas meter replacement)}.

[Process of Calculating Remaining Gas Amount]

In the process of calculating the remaining gas amount, the remaining gas amount on the current meter indication date is calculated based on {(a remaining gas amount in a gas cylinder installed in a supply facility)−(the gas usage obtained in the aforementioned processing of calculating the gas usage)}.

FIG. 3 is a diagram showing an exemplary structure of customer information d30 stored in the storage device 307 of the delivery server 101. As shown in FIG. 3, items stored in the storage device 307 include "customer ID" d31 for identifying each customer, "meter number" d32 for identifying each gas meter, and so forth. Further, items stored in the storage device 307 include "gas cylinder capacity" d33 indicating the capacity of each gas cylinder installed in each supply facility, "number of cylinders" d34 indicating the number of gas cylinders installed in each supply facility, "entire/half classification" d35 indicating whether or not a gas cylinder group composed of two banks of one or more gas cylinders should be entirely replaced, and "area code" d36 for identifying each area that one or more supply facilities are installed. In the example of FIG. 3, "1" is assigned as the value of "entire/half classification" d35 when entire replacement is performed, whereas "2" is assigned as the value of "entire/half classification" d35 when half replacement is performed. When "1" indicating entire replacement is assigned, this means that the first bank of gas cylinder (or cylinders) is also replaced when the second bank of gas cylinder (or cylinders) is replaced. When "2" indicating half replacement is assigned, this means that the gas cylinders are replaced one by one.

FIG. 4 is a diagram showing an exemplary structure of information including the remaining gas amount, stored in the storage device 307 of the delivery server 101. As shown in a table d40 of FIG. 4, items stored in the storage device 307 include the aforementioned "customer ID" d41, the aforementioned "meter number" d42, "remaining gas amount" d43 and "replacement flag" d44. The "remaining gas amount" d43 indicates the remaining gas amount in a gas cylinder currently used. The "replacement flag" d44 is information indicating whether or not the currently used gas cylinder should be replaced when the remaining gas amount of the currently used gas cylinder reaches a predetermined value. For example, as to half replacement where two gas cylinders are installed in a supply facility, gas may be supplied from the second gas cylinder when the first gas cylinder becomes empty (if an automatic switch device is installed). Thus, a replacement flag is required for determining whether or not gas cylinder delivery is required. In the "replacement flag" 44d, "1" indicates that the currently used gas cylinder is intended for replacement.

It should be noted that in FIG. 4, the meter number of a gas meter, denoted by a reference d1, is "56AB001".

[Action of Delivery Server]

Figure 5:
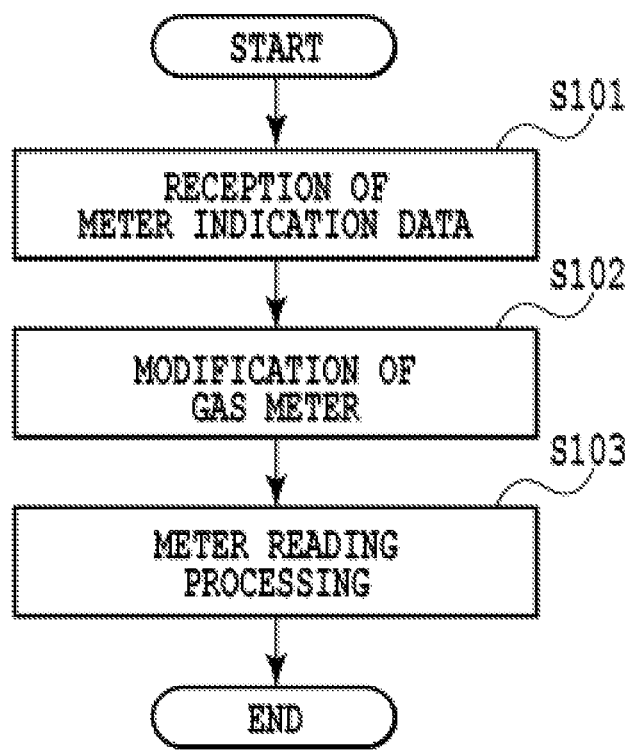
FIG. 5 is a flowchart showing an exemplary entire operation of the delivery server according to the exemplary embodiment of the present invention.

Next, with reference to FIGS. 5 to 8, explanation will be provided for a method of performing a gas meter reading process with use of a set of meter indication data of an existing gas meter installed in a supply facility (gas cylinder) and a set of meter indication data of a new gas meter when the respective sets of meter indication data are transmitted to the delivery server 101 from a given mobile terminal 105 when replacing the existing gas meter to the new gas meter. FIG. 5 is a flowchart showing an exemplary entire action of the delivery server 101. FIG. 6 is a diagram showing an exemplary display screen when the mobile terminal 105 transmits respective sets of meter indication data when replacing a gas meter, whereas FIG. 7 is exemplary meter indication data. FIG. 8 is a diagram showing an exemplary structure of multiple sets of meter indication data stored in the storage device 307 of the delivery server 101.

Firstly in FIG. 5, when the mobile terminal 105 transmits a set of meter indication data of the existing gas meter and that of the new gas meter to the delivery server 101, the CPU 301 (the reception unit 31) of the delivery server 101 is configured to receive the respective sets of meter indication data (S101). Now, FIG. 6 shows an exemplary operating screen to be displayed when the mobile terminal 105 transmits the respective sets of meter indication data in gas meter replacement.

As shown in FIG. 6, an operating screen d60 includes, for instance, uninstalled meter number (meaning "the meter number of the existing gas meter") d61, uninstalled meter indication (meaning "the meter indication of the existing gas meter") d62, installed meter number (meaning "the meter number of the new gas meter") d63, installed meter indication (meaning "the meter indication of the new gas meter") d64, and so forth. In the explanation of the present exemplary embodiment, a set of data including the detached meter number and the uninstalled meter indication is referred to as a set of meter indication data of the existing gas meter in gas meter replacement. On the other hand, a set of data including the installed meter number and the installed meter indication is referred to as a set of meter indication data of the new gas meter in gas meter replacement. Thus, the respective sets of meter indication data of the gas meters being installed before and after replacement can be transmitted to the delivery server 101 as associated with each other.

In the present exemplary embodiment, a QR code (registered trademark) (readable information code), for instance, is attached to each of the existing and new gas meters. Hence, the mobile terminal 105 is configured to be capable of obtaining the aforementioned detached meter number and attached meter number by reading the QR code (registered trademark). It should be noted that the aforementioned uninstalled meter indication and installed meter indication are obtained based on, for instance, an input operation by a worker. Further, the date on which the QR code (registered trademark) is read, for instance, is set as registration date d65 on the "meter replacement registration" screen d60 exemplified in FIG. 6, i.e., as the timing of gas meter replacement.

When receiving the aforementioned respective sets of meter indication data, the CPU 301 (the modification unit 32) of the delivery server 101 is configured to modify the new gas meter as a gas meter to be managed that is installed in the relevant supply facility on the basis of the respective sets of meter indication data and cause the storage device 307 to manage the gas meter to be managed (S102). When the existing gas meter is managed as a gas meter with the meter number "56AB001" (denoted by the reference d1 in FIG. 4) in the storage device 307, the meter number is modified into a meter number included in the meter indication data of the new gas meter. Thus, the meter indication of the existing gas meter and that of the new gas meter in gas meter replacement are respectively managed.

In S103 of FIG. 5, the CPU 301 (the meter reading processing unit 33) of the delivery server 101 is configured to perform a gas meter reading processing for the supply facility when receiving, for instance, the meter indication data of the new gas meter on the current meter reading date (meter indication date) from the mobile terminal 105 after the aforementioned gas meter replacement, i.e., on and after the processing of S102. The meter reading processing is configured to be performed based on the aforementioned set of meter indication data on the current meter reading date, the aforementioned sets of meter indication data of the new gas meter and the existing gas meter that are received in S101, and a set of meter indication data of the existing gas meter received, for instance, on the previous meter reading date (meter indication date) of earlier than the processing of S101 (indication data on the previous meter reading date).

For example, when the aforementioned gas meter indication processing is calculation of the gas usage, the CPU 301 is configured to calculate the gas usage consumed in the supply facility (gas cylinder) in a period from the previous meter indication to the current meter indication on the basis of {(a meter indication included in the meter indication data on the current meter reading date)−(a meter indication included in the meter indication data of the new gas meter received in S101)}+{(a meter indication included in the meter indication data of the existing gas meter received in S101)−(a meter indication of the meter indication data on the previous meter reading date)}. Thus, even when gas meter replacement is performed, the gas usage can be quickly and accurately obtained for the supply facility.

It should be noted that the aforementioned sets of meter indication data are all stored in the storage device 307, and relevant sets of meter indication data are read out from the storage device 307 in the processing of S103.

As shown in FIG. 7, sets of meter indication data d70 on the current and previous meter reading dates herein respectively include meter reading ticket ID d71, area code d72, meter reader ID d73, meter reading date d74, customer ID d75, meter number d76, meter indication d77 and so forth. In the present exemplary embodiment, the QR code (registered trademark) (readable information code), for instance, is attached to the gas meter. Hence, the mobile terminal 105 is configured to be capable of obtaining each set of meter indication data excluding a meter indication and a meter reading date by reading the QR code (registered trademark). It should be noted that the meter indication shown in FIG. 7 is obtained based on, for instance, an input operation by a meter reader, whereas the date on which the QR code (registered trademark) is read, for instance, is set as the meter reading date.

In the present exemplary embodiment, when receiving the meter indication data on the meter reading date from the mobile terminal 105, the CPU 301 (the reception unit 31) of the delivery server 101 is configured to cause the storage device 307 to store the meter indication data. FIG. 8 shows exemplary stored data.

As shown in a table d80 of FIG. 8, multiple sets of meter indication data, received by the CPU 301, are stored in the storage device 307. The table d80 includes customer ID d81, area code d82, customer ID d83, meter number d84, meter reading date d85 and meter indication d86.

It should be noted that in S103 of FIG. 5, when the aforementioned gas meter indication processing is calculation of the remaining gas amount, the CPU 301 is configured to subtract the gas usage obtained in the aforementioned gas usage calculation from the remaining gas amount in the supply facility managed by the storage device 307, and is configured to set "the remaining gas amount" in the storage device 307 as a post-subtraction value. Accordingly, even when gas meter replacement is performed, the remaining gas amount can be quickly and accurately obtained for the supply facility.

As explained above, when gas meter replacement is performed, the delivery server 101 of the present exemplary embodiment is configured to manage the new gas meter as a gas meter to be managed and receive the respective sets of meter indication data of the existing gas meter and the new gas meter from the mobile terminal 105 on a real-time basis. Further, the delivery server 101 is configured to perform the meter reading processing for the same supply facility by use of the received sets of meter indication data. Therefore, even when gas meter replacement is performed, the meter reading processing can be quickly performed in accordance with the meter indications of gas meters.

The exemplary embodiment has been explained above, but specific data structures and so forth are not limited to those described in the exemplary embodiment and may be changed.

(Variation 1)

For example, it is shown that in S103 in FIG. 5, as an example, the delivery server 101 is configured to receive the respective sets of meter indication data on the previous and current meter reading dates. However, the delivery server 101 can receive meter indication data in opening/closing a gas valve, in conducting a safety inspection or in delivering a gas cylinder.

(Variation 2)

In the above, a product model number of a gas meter is not referred to; however, prior to the gas meter replacement (prior to the S101 process), the product model number of the gas meter is determined according to a gas flow rate to be consumed by gas consumption equipment and information for replacing with a gas meter according to the product model number can be provided. That is, the CPU 301 calculates the gas flow rate to be used by the gas meter and then determines the product model number according to the calculated gas flow rate.

In the following, actions of the server 101 for realizing this determination process are described.

First, in reference to data processed in the server 101 (i.e. master date for gas meter, date for gas consumption equipment of customers and gas flow rate date for gas consumption equipment), it is described with reference to FIGS. 9 to 11.

FIG. 9 is a diagram showing an exemplary gas meter table d90 that includes a gas meter product model number described below. The table d90 is stored by the storage device 307 In an example of the table d90 shown in FIG. 9, items such as meter number d91, product model d92, gas type d93, flow range d94 and maximum usage flow rate d95 are associated. It is note that the meter number d91 of FIG. 9 is the same as the meter number d32 of FIG. 3.

In the product model d92, a product model number of the gas meter (e.g. 1, 2, . . . ) is set. As the product model number is greater, gas flow rate and maximum usage flow rate are larger as described below.

In the gas type d93, gas types indicating such as LPG (Liquefied Petroleum Gas) or LNG (Liquefied Natural Gas) are set.

The flow rate d94 is used when the gas meter has a function of shutoff of supply gas. That is, in case that the gas meter has such a function, a range (e.g. range of 1 to 10) is set in the flow rate d94, here, the range indicates an upper level of the gas flow rate (cut-off level) when the shutoff is realized with the function. In this case, even though the gas meters have the same product model numbers, their flow ranges can be set dividedly in many stages (e.g. in three stages).

In the maximum usage flow range d95, a maximum usage flow range for the gas meter is set.

It is noted that in FIG. 9, for example, the product model d92 for the gas meter having the gas meter d1 of "56AB001" is set as "4" and the gas type d93 is set as "LPG". In addition, "5" is set to the above flow range d94.

Figure 10:
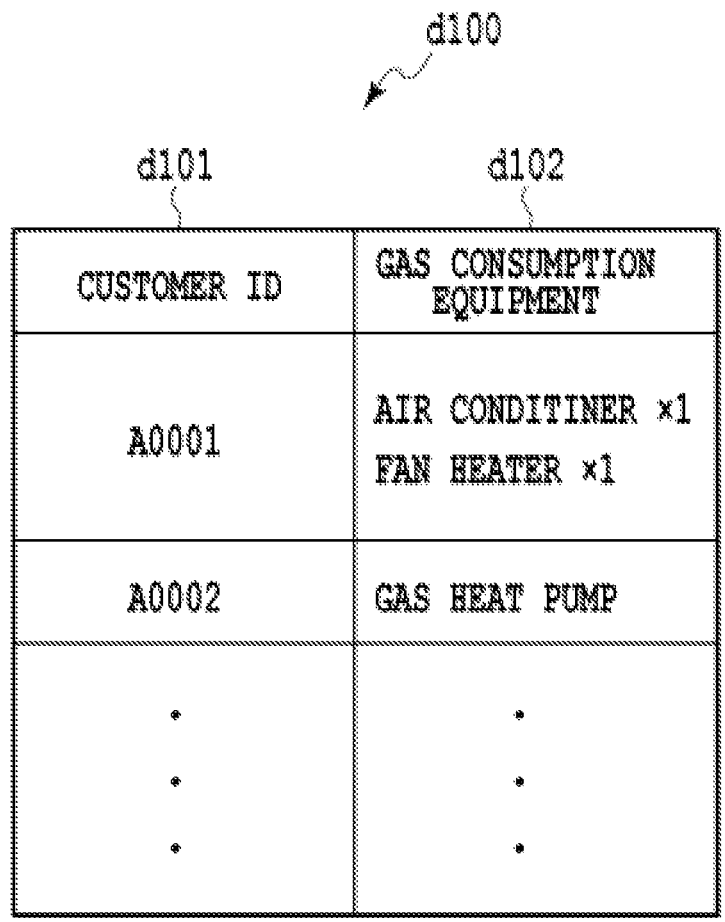
FIG. 10 is a diagram showing an exemplary table of gas consumption equipment for each customer.

FIG. 10 is a diagram showing an exemplary table d100 for gas consumption equipment of each customer. This table d100 stores data for gas consumption equipment of customers.

As shown in FIG. 10, in the table d100, for example, customer ID d101 for identifying each customer and the gas consumption equipment d102 for indicating gas consumption equipment of customers are associated. It is noted that the customer ID d101 in FIG. 10 is the same as the customer ID d31 in FIG. 3.

The gas consumption equipment includes, for example, an air conditioner, a fan heater, a gas heat pump (cooling heating) and so forth.

In the gas consumption equipment d102, the number of the corresponding gas consumption equipment is also set.

Figure 11:
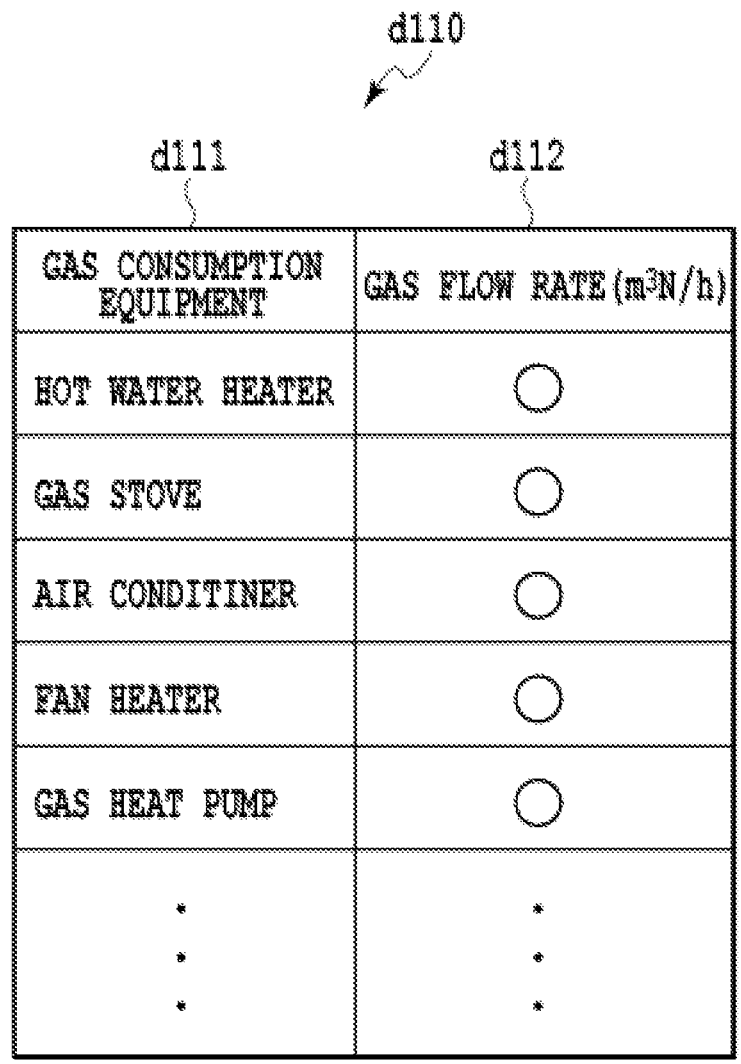
FIG. 11 is a diagram showing an exemplary gas consumption equipment table.

FIG. 11 is a diagram showing an exemplary gas consumption equipment table d110. This table d110 preliminarily stores data for the gas flow rate consumed by each of the gas consumption equipment. It is noted that in this variation, information in the tables d100 and d110 is referred to as information relating to the gas consumption equipment of the customer.

As shown in FIG. 11, in the table d110, for example, the gas consumption equipment d111 and the gas flow rate d112 are associated. In the gas consumption equipment d111, data for identifying the air conditioner, the fan heater, the gas heat pump (cooling heating) and so forth is set.

Figure 12:
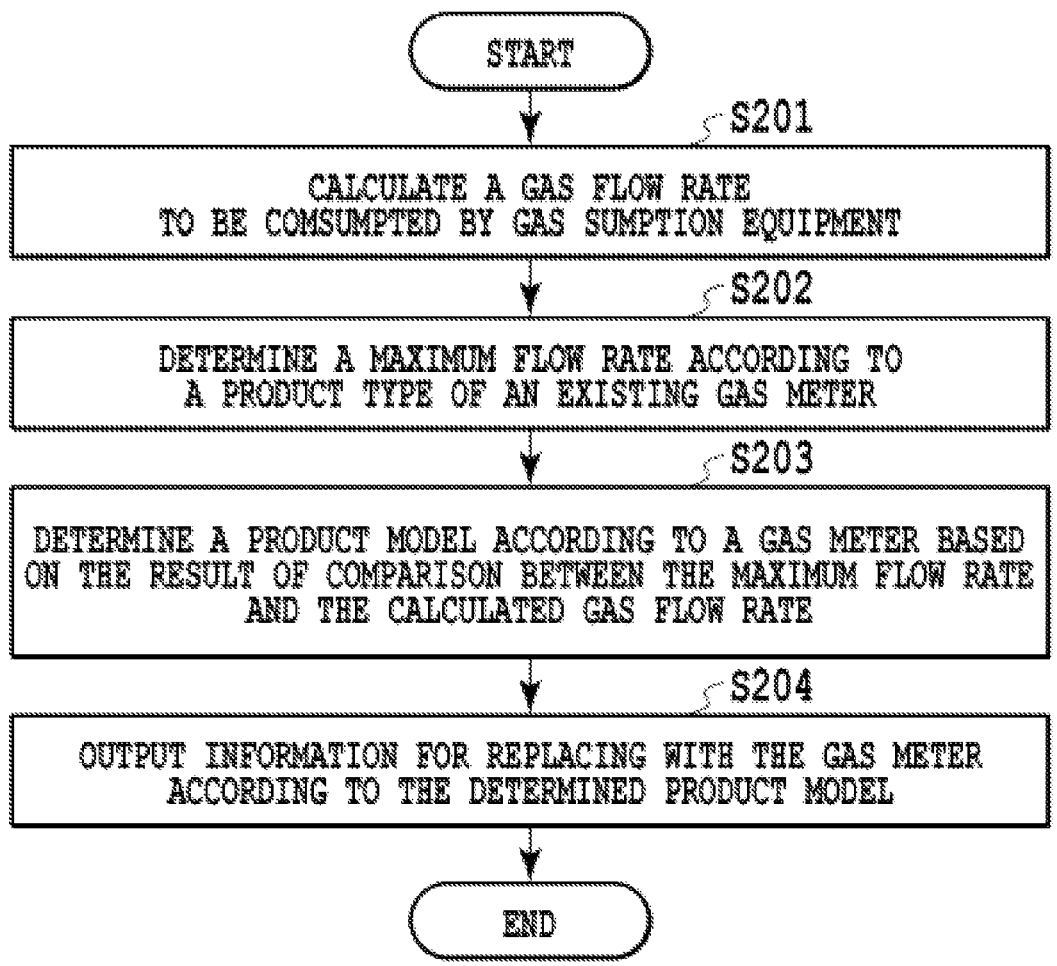
FIG. 12 is a flowchart showing an exemplary control process of the server.

Next, the process to be executed for the determination of the product model number of the gas meter will be described with reference to FIGS. 2, 9 to 11 and 12. FIG. 12 is a flowchart showing an exemplary control process of the server 10.

In FIG. 12, the CPU 301 calculates a gas flow rate to be consumed by the gas consumption equipment of the customer (Step S201). As a timing of the calculation process in Step S201, for example, there is the case where the CPU 301 receives from the communication terminal 105 or the client computer system 103 information for indicating that an installation state of the gas consumption equipment of the customers is changed (a new installation of the gas consumption equipment, a modification of the gas consumption, changes in the number of gas consumption equipment or so forth), or the case where the CPU 301 receives an error information for the gas meter (run out of battery, gas shutoff or so forth).

In the calculation process in Step S201, the CPU 301 reads from the table d100 of FIG. 10 the gas consumption equipment data of the customer corresponding to the customer ID and reads the gas flow rate corresponding to the read gas consumption equipment data. Then, the CPU 301 calculates the gas flow rate to be consumed by the gas consumption equipment of the customer. As an example in FIG. 10, the case where the customer ID is "A0001", since one air conditioner and one fan heater for the customer are set respectively, the CPU 301 adds up each gas flow rate (FIG. 11) for the corresponding air conditioner and the fan heater. The added value is used as a gas flow rate to be consumed by the gas consumption equipment of the customer.

Next, the CPU 301 identifies a maximum usage flow rate according to the product model number of the current gas meter (Step S202). In this case, the CPU 301 reads from the table d90 of FIG. 9 the product model d92 for the corresponding gas meter and reads and identifies the data for the maximum usage flow rate d95 corresponding to the read product model number.

Then, the CPU 301 compares the maximum usage flow rate identified in Step S202 with the gas flow rate calculated in Step S201 and determines a product model number based on the result of the comparison (Step S203). When the gas flow rate is determined as less than the maximum usage flow rate and is greater than the maximum usage flow rate for the smaller product model number, the product model number of the current gas meter is determined as being proper. On the other hand, in the other case, after the product model number of the current gas meter is determined as being improper and a proper product model number is determined, the aforementioned process in Step S204 is performed.

It is noted that the maximum usage flow rate for each product model number is preliminarily stored in the storage device 307.

As an example of the case where a proper product model number is determined in Step S203, for example, there is the case where the gas flow rate is the same or greater than the maximum usage flow rate, or the case where the gas flow rate is less than the maximum usage flow rate for the smaller product model number than the product model number of the current gas meter or so forth. As an example of a proper product model number when the gas flow rate is the same or greater than the maximum usage flow rate, there is the case where the greater product model number is determined for the current gas meter (e.g. "4"→"5" and so forth). Furthermore, as an example of a proper product model number when the gas flow rate is less than the maximum usage flow rate, there is the case where the smaller product model number is determined for the current gas meter (e.g. "5"→"4" and so forth).

The CPU 301 outputs to the communication terminal 105 or the client computer system 103 information for replacing with the gas meter according to the product model number determined in Step S203 (Step S204). The information for replacing with the aforementioned gas meter may include a product model number of the gas meter to be replaced. For example, the information includes a customer name, a meter number and product model number for the current gas meter, and a product model number of a new gas meter. By doing so, information for assisting the replacement for gas meters is provided. After the gas meter replacement, the process in Step S101 can be performed.

(Variation 3)

In FIG. 12, the aforementioned current gas meter and new gas meter can handle different gas types. This enables the CPU 301 to determine and output a product model number of gas meters with different gas types, even though there is the case where the gas meters with the different gas types are replaced, such as the case where a gas meter for LNG is replaced with a gas meter for LPG.

For example, when the gas supplied with the customer is changed "LPG" to "LNG", in the process in shown in FIG. 5, the CPU 301 receives the meter indication data of each of the corresponding gas meters (Step S101), since the gas meter of the customer is changed from the "LPG" gas meter (existing) to the "LNG" gas meter (new). In this variation, the meter indication data of each of the gas meters is also received using the operating screen d60. In this case, the operation screen d60 shown in FIG. 6 further includes an item in "gas type" for inputting "LPG" or "LNG". This enables the CPU 301 to receive further information of "LNG" indicated in the "gas type" item.

Next, the CPU 301 stores information relating to a new gas meter for "LNG" in the storage device 307 as with the above STEP S102 process in FIG. 5. That is, by the CPU 301, the "meter number" for the "LGN" gas meter corresponding to the "customer ID" is included in the customer information d30 in FIG. 3. In addition, the "gas type" corresponding to the "customer ID" is also stored in the table d90.

In addition, the CPU 301 performs a gas meter reading processing using sets of meter indication data of the existing gas meter and the new gas meter. In this variation, since the different gas type is handled in the gas replacement, the CPU 301 calculates the corresponding gas usage for each gas type. For example, the "LPG" gas usage is calculated based on the formulate (1) of {(a meter indication included in meter indication data of the existing gas meter received in S101)}−{(a meter indication of the meter indication data of the existing gas meter on the previous meter reading date)}. The "LNG" gas usage is calculated based on the formula (2) of {(a meter indication included in meter indication data of the new gas meter on the current meter reading date)}−{(a meter indication of the meter indication data of the new gas meter received in S101)}.

In general, the gas rates for "LPG" and "LNG" are different. In light of this, the CPU 301 can calculate the gas usage by multiplying a correction coefficient to the differences between the meter indications indicated in the formula (2), according to for example the "LPG" gas rate. In addition, the CPU 301 can calculate a gas fee according to the corresponding gas usage for the type of one of "LPG" and "LNG".

It is noted that in this variation the aforementioned meter indication is stored in the storage device 307 and the CPU 103 properly reads the corresponding meter indication from the storage device 307.

Such a meter reading process allows the gas usage to be calculated promptly and exactly, even though the gas meter replacement for the different gas type is performed.

(Variation 4)

The CPU 301 can receive the gas usage read by the gas meter (with the above shutoff function) to determine a shutoff level of gas supplied for the gas meter according to the gas flow rate calculated based on the gas usage. Since the gas shutoff level corresponds to the flow range d94 in FIG. 9, the CPU 301 can change a value of the flow range d94 and reflect a current state of the gas flow rate actually in use.

The invention claimed is:

1. A gas meter reading system for performing a gas meter reading processing for detecting a gas usage in each of a plurality of supply facilities, comprising:
    a memory configured to manage at least one set of meter indication data of each of a plurality of gas meters installed in the plurality of supply facilities;
    a processor coupled to the memory, the processor configured to:
    receive from a communication terminal a set of meter indication data of an existing gas meter and a set of meter indication data of a new gas meter when gas meter replacement is performed, the memory further stores information relating to gas consumption equipment of a customer and gas flow rate according to product model number of the gas meter;
    wherein, prior to the gas meter replacement, the processor is configured to:
    calculate a gas flow rate to be consumed by the gas consumption equipment of the customer based on the information relating to the gas consumption equipment stored in the memory;
    read a maximum flow rate from the memory according to a product model number of a current gas meter to determine a product model number according to the calculated gas flow rate based on a result of a comparison between the maximum flow rate and the calculated gas flow rate;
    output information for replacing the product model number of the current gas meter with a different product model number of the new gas meter to a communication terminal or a client computer;
    manage the new gas meter that is installed in a corresponding one of the plurality of supply facilities; and
    perform the gas meter reading processing for the corresponding one of the plurality of supply facilities when the set of meter indication data of the new gas meter in the corresponding one of the plurality of supply facilities on a current meter indication date is received from the communication terminal after the gas meter replacement, with the gas meter reading processing configured to be performed based on the received set of meter indication data, respective sets of meter indication data of the new gas meter and the existing gas meter in the gas meter replacement, and a set of meter indication data of the existing gas meter in the corresponding one of the plurality of supply facilities on a previous meter indication date of earlier than the gas meter replacement.

2. The meter reading system according to claim 1, wherein the existing gas meter and the new gas meter handle different gas.

3. The meter reading system according to claim 1, wherein when the processor receives information for indicating modification of the gas consumption equipment of the customer, the processor is further configured to calculate a gas flow rate to be consumed by the modified gas consumption equipment based on the information and determine a product model number of a gas meter according to the gas flow rate.

* * * * *